(12) United States Patent
Notte et al.

(10) Patent No.: US 7,070,746 B1
(45) Date of Patent: Jul. 4, 2006

(54) PROCESS FOR NITROUS OXIDE PURIFICATION

(75) Inventors: Patrick Notte, Wavre (BE); Barry L. Bowman, Greenwood, SC (US); Judith P. Oppenheim, Pensacola, FL (US); Alexander Stepanovich Noskov, Novosibirsk (RU); Ramoorthy Chandrasekhar, Greer, SC (US); Gregory P Croce, Concord, CA (US)

(73) Assignee: Solutia Inc., St. Louis, MO (US)

( * ) Notice: Subject to any disclaimer, the term of this patent is extended or adjusted under 35 U.S.C. 154(b) by 0 days.

(21) Appl. No.: 09/320,077

(22) Filed: May 26, 1999

(51) Int. Cl.
*C01B 21/22* (2006.01)

(52) U.S. Cl. .............. 423/219; 423/239.1; 423/245.3; 423/247; 423/400

(58) Field of Classification Search ............... 423/400, 423/402, 403, 404, 210, 230, 239.1, 245.3, 423/247, 219
See application file for complete search history.

(56) References Cited

U.S. PATENT DOCUMENTS

| | | | |
|---|---|---|---|
| 4,220,632 A | 9/1980 | Pence et al. ............. 423/239 |
| 4,221,768 A | 9/1980 | Inoue et al. ............. 423/239 |
| 4,224,292 A | 9/1980 | Uchida et al. ............ 423/239 |
| 4,268,488 A | 5/1981 | Ginger ................ 423/239 A |
| 4,351,811 A * | 9/1982 | Matsuda et al. ........... 423/239 |
| 4,378,338 A | 3/1983 | Imanari et al. ........... 423/239 |
| 4,438,082 A | 3/1984 | Dettling et al. .......... 423/235 |
| 4,473,535 A | 9/1984 | Kittrell et al. .......... 423/239 |
| 4,521,388 A | 6/1985 | Samish et al. ........... 423/235 |
| 4,579,723 A | 4/1986 | Weltmer et al. .......... 423/219 |
| 4,695,437 A | 9/1987 | Jung .................... 423/239 |
| 4,695,438 A | 9/1987 | Becker et al. ........... 423/239 |
| 4,720,476 A | 1/1988 | Schneider et al. ........ 502/81 |
| 4,732,743 A | 3/1988 | Schmidt et al. .......... 423/239 |
| 4,742,037 A | 5/1988 | Baiker et al. ........... 502/247 |
| 4,789,533 A | 12/1988 | Baiker et al. ........... 423/239 |
| 4,812,296 A | 3/1989 | Schmelz et al. .......... 423/239 |
| 4,855,115 A | 8/1989 | Imanari et al. .......... 423/239 |
| 4,859,439 A | 8/1989 | Rikimaru et al. ......... 423/239 |
| 4,865,827 A | 9/1989 | Tachi et al. ............ 423/239 |
| 4,910,005 A | 3/1990 | Heins et al. ............ 423/239 |
| 4,916,107 A | 4/1990 | Brand et al. ............ 502/309 |
| 4,929,586 A | 5/1990 | Hegedus et al. .......... 502/217 |
| 4,946,661 A | 8/1990 | Tachi et al. ............ 423/239 |
| 4,950,139 A | 8/1990 | Fennemann et al. ........ 423/239 |
| 4,975,256 A | 12/1990 | Hegedus et al. .......... 423/239 |
| 4,977,127 A | 12/1990 | Rikimaur et al. ......... 502/309 |
| 5,045,516 A | 9/1991 | Vogel et al. ............ 502/309 |
| 5,132,103 A | 7/1992 | Schoubye ................ 423/239 |
| 5,137,703 A | 8/1992 | Lichtin et al. .......... 423/239 |
| 5,143,707 A | 9/1992 | Beck et al. ............. 423/239 |
| 5,198,403 A | 3/1993 | Brand et al. ............ 502/204 |
| 5,225,390 A | 7/1993 | Vogel et al. ............ 502/309 |
| 5,275,792 A | 1/1994 | Obuchi et al. ........... 423/239.1 |
| 5,283,055 A | 2/1994 | Luck ................... 423/239.1 |
| 5,314,853 A | 5/1994 | Sharma ................. 502/66 |
| 5,401,478 A | 3/1995 | Chang et al. ............ 423/235 |
| 5,401,479 A | 3/1995 | Matros et al. ........... 423/239.1 |
| 5,415,850 A | 5/1995 | Yang et al. ............. 423/239.1 |
| 5,510,092 A | 4/1996 | Mansour et al. .......... 423/239.1 |
| 5,520,895 A | 5/1996 | Sharma et al. ........... 423/239.2 |
| 5,552,128 A | 9/1996 | Chang et al. ............ 423/235 |
| 5,582,809 A | 12/1996 | Rikimaru et al. ......... 423/239.1 |
| 5,693,300 A | 12/1997 | Slone ................... 423/235 |
| 5,720,931 A | 2/1998 | Rossin et al. ........... 423/236 |
| 5,723,404 A | 3/1998 | Bütje et al. ............ 502/350 |
| 5,738,024 A | 4/1998 | Winegar ................ 110/345 |
| 5,753,582 A | 5/1998 | Garcin et al. ........... 502/323 |
| 5,811,067 A | 9/1998 | Lecuyer et al. .......... 423/239.2 |
| 5,830,421 A | 11/1998 | Gardner et al. .......... 423/213.2 |

FOREIGN PATENT DOCUMENTS

| | | | | |
|---|---|---|---|---|
| DE | 83974 | * | 8/1970 | |
| EP | 0 004 080 A2 | * | 9/1979 | ........... 423/400 |
| EP | 0 516 401 A1 | | 12/1992 | |
| EP | 0 636 576 A1 | * | 2/1995 | |
| EP | 0 792 679 A1 | | 9/1997 | |
| JP | 45-13446 | * | 5/1970 | ........... 423/400 |
| JP | 6-16402 | | 1/1994 | |
| JP | 6122506 A | * | 5/1994 | |

OTHER PUBLICATIONS

Grant and Hackh's *Chemical Dictionary* 5th Ed., McGraw–Hill Book Co. USA, ISBN 0-07-024067-1, p. 295, 1987.*

* cited by examiner

*Primary Examiner*—Wayne A. Langel
*Assistant Examiner*—Timothy C. Vanoy
(74) *Attorney, Agent, or Firm*—Howrey, Simon, Arnold and White

(57) ABSTRACT

A method for purification of an oxygen contaminated nitrous oxide gas by feeding the nitrous oxide gas and a reducing agent such as hydrogen, carbon monoxide or ammonia into a de-oxidation reactor, performing de-oxidation by reacting the reducing agent with oxygen using a catalyst such as palladium or platinum in order to deplete the oxygen in the nitrous oxide gas, while limiting the amount of nitrous oxide removed from the nitrous oxide gas.

16 Claims, 6 Drawing Sheets

Figure 1: %O$_2$ Destruction vs. H$_2$ Flow
4.6 sec; 150 Deg C
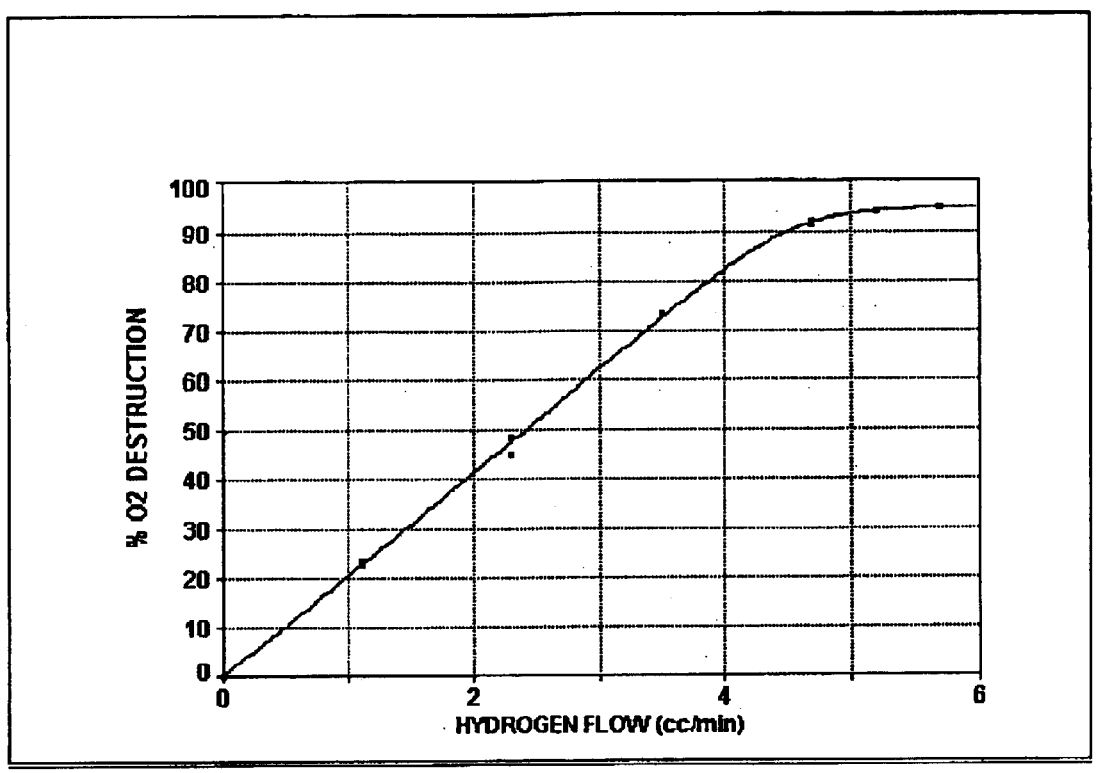

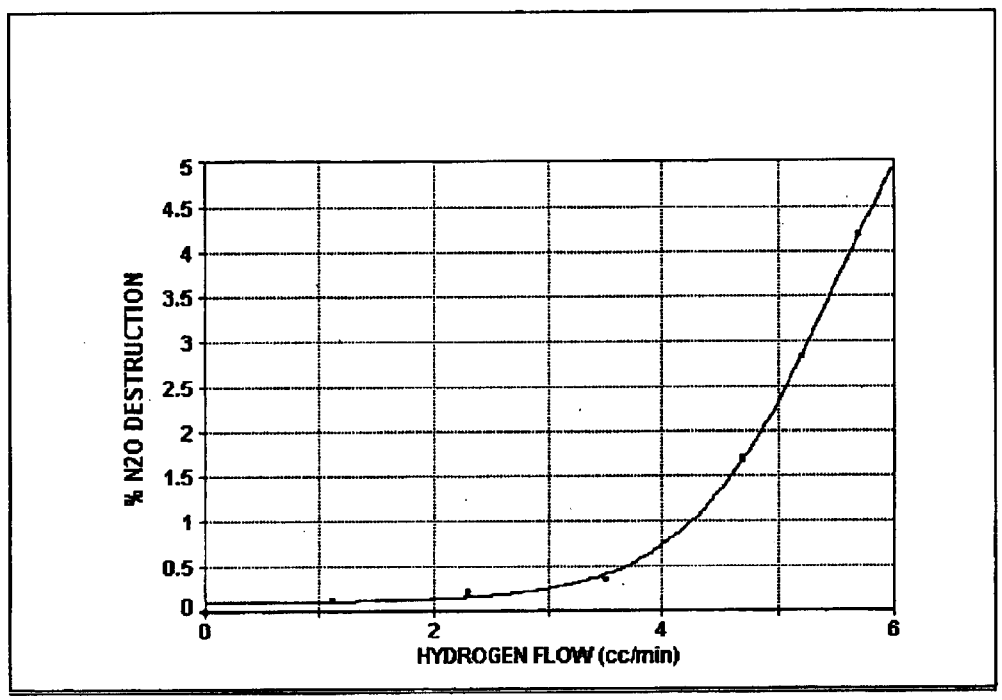
Figure 2: %N$_2$O Destruction vs. H$_2$ Flow
4.6 sec; 150 Deg C

Figure 3: %$O_2$ Destruction Selectivity vs. $H_2$ Flow
4.6 sec; 150 Deg C
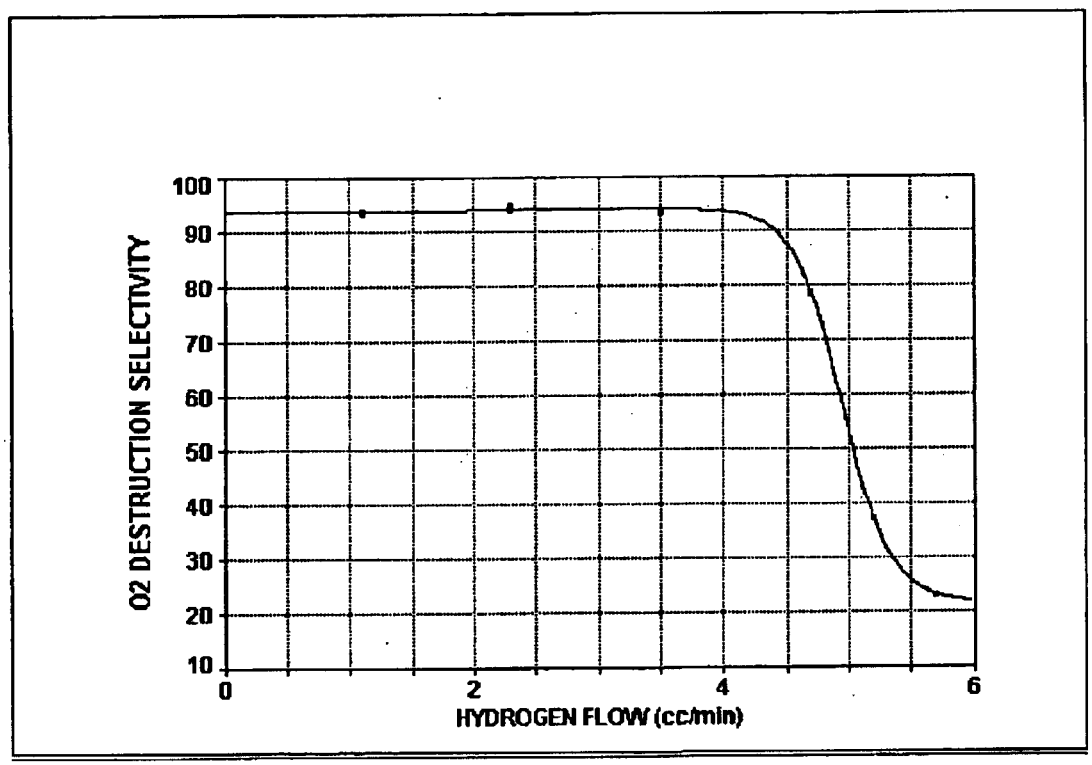

Figure 4: %O$_2$ Destruction vs. H$_2$ Flow
.7 sec; 25 Deg C
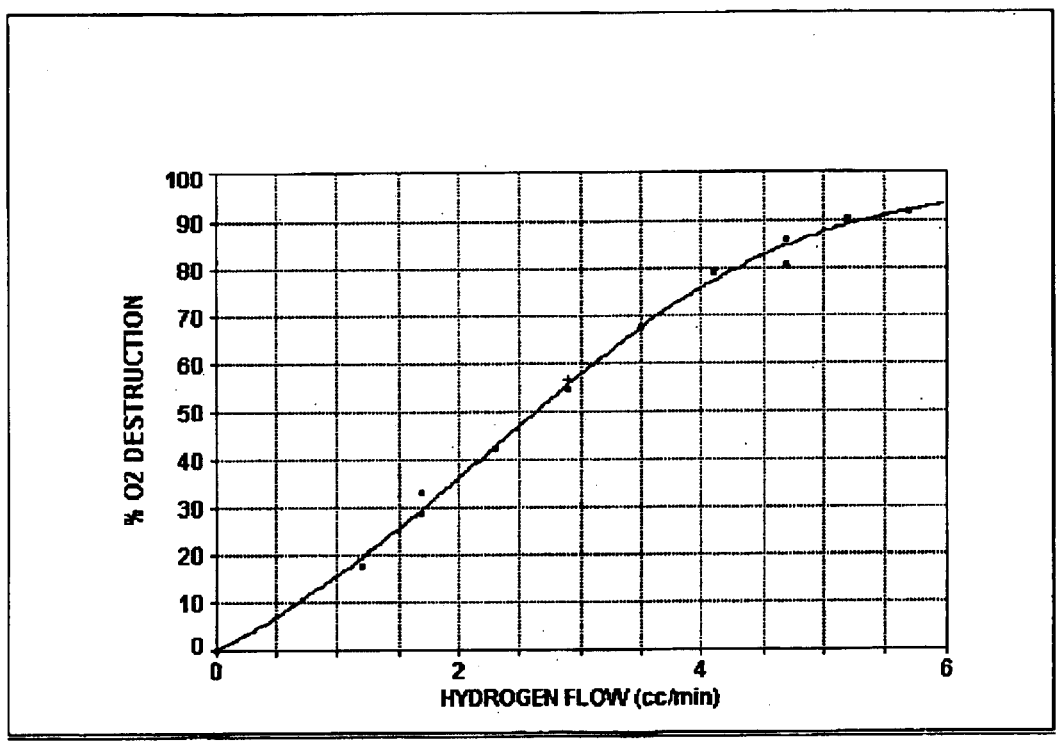

Figure 5: %N$_2$O Destruction vs. H$_2$ Flow
.7 sec; 25 Deg C
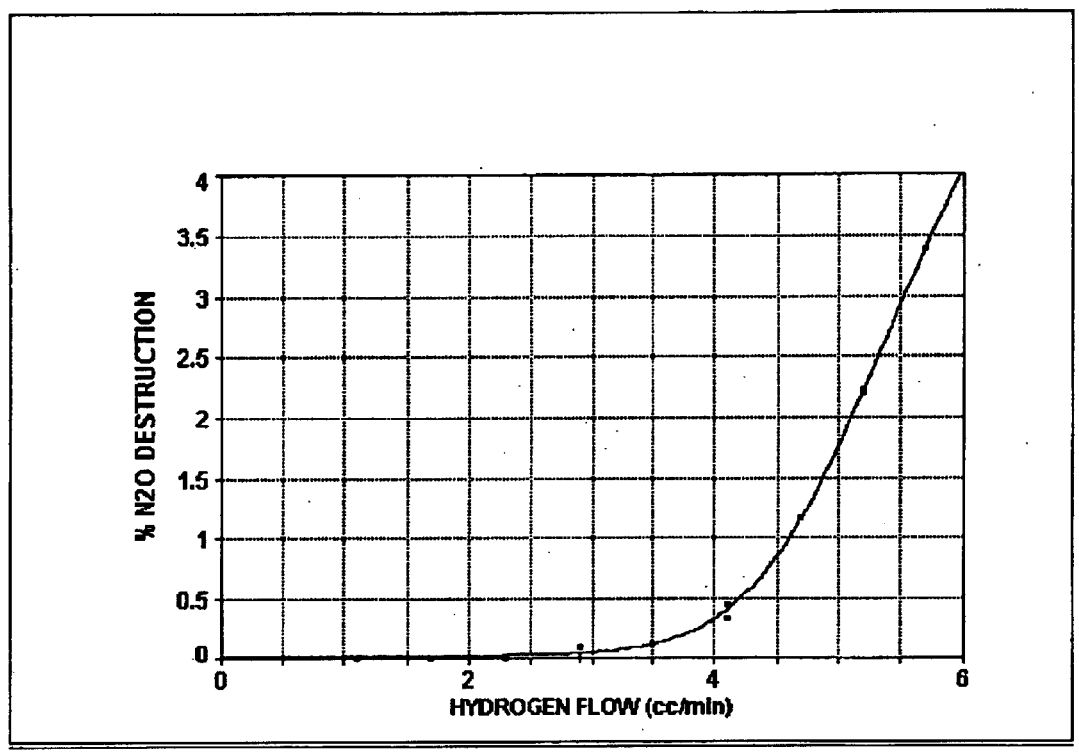

Figure 6: %$O_2$ Destruction Selectivity vs. $H_2$ Flow
.7 sec; 25 Deg C
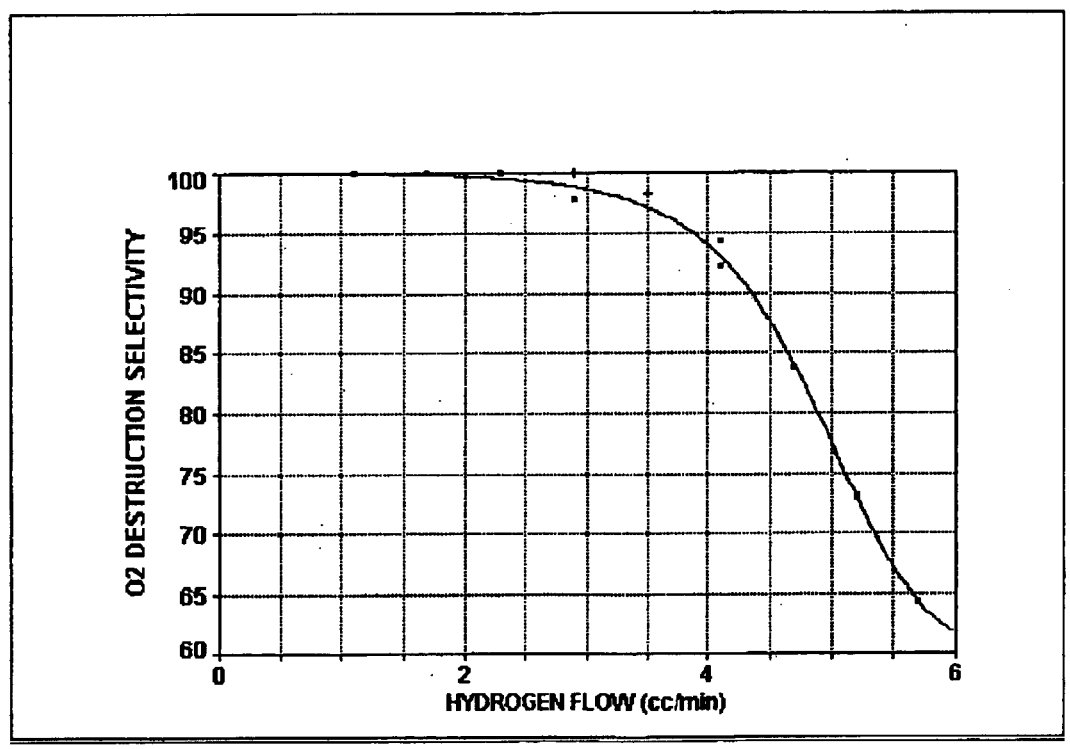

PROCESS FOR NITROUS OXIDE PURIFICATION

FIELD OF THE INVENTION

The present invention relates to a process for purifying a nitrous oxide gas by removal of various impurities.

BACKGROUND OF THE INVENTION

A number of processes for purification of off-gases and exhaust gases produced from various thermal power plants are known in the art. Such gases contain undesirable components, such as NOx (nitrogen oxides including NO, $N_2O_3$, $NO_2$, $N_2O_4$, $N_2O_5$, etc.), sulfur oxides, and the like. These processes are based either on absorption of such impurities by liquid absorbents, or on their conversion (reduction) into harmless compounds (e.g., water vapor and nitrogen in the case of NOx reduction). The most widely employed processes for reduction of NOx use ammonia and selective catalytic reduction (SCR). The SCR processes make it possible to carry out the reduction of NOx to elemental nitrogen and water vapor in the presence of oxygen contained in the off-gases. See U.S. Pat. Nos. 5,401,479; 4,859,439; 4,855,115; 4,789,533; 4,438,082; 4,720,476; 4,695,438; 4,732,743; 4,975,256; 4,521,388; 5,401,478; and 5,753,582, the entire subject matter of which is incorporated herein by reference. After off-gases are cleaned of minor impurities by conventional processes/equipment, they are vented to the atmosphere.

Moreover, there are also known processes for purifying various commercial grade gases, such as inert gases. For example, U.S. Pat. No. 4,579,723, the entire subject matter of which is incorporated by reference, utilizes a multi-step catalytic process to remove CO, $CO_2$, $H_2$, $H_2O$, and $O_2$ from an argon gas.

Various processes have been utilized for removing $O_2$ from very pure nitrous oxide gas produced from stand alone commercial processes for subsequent use in semiconductor manufacturing. In Japanese Kokai No. 06016402, oxygen is removed from commercially produced nitrous oxide using a manganese oxide catalyst. However, oxygen is removed by using oxygen present in the gas to oxidize the catalyst from a lower to a higher manganese oxide, which does not involve catalysis of reactions involving oxygen containing gases to form easily removed products.

Heretofore, removal of impurities from nitrous oxide off-gases has not been contemplated. Releasing nitrous oxide off-gases into the environment is a source of pollution and a waste of nitrous oxide that, if economically and feasibly separated from such off-gases to provide a commercial grade nitrous oxide source, could lead to its use in various processes, such as for use in conversion of benzene to phenol by hydroxylation. See U.S. Pat. Nos. 4,982,013; 5,001,280; 5,055,623; 5,110,995; 5,672,777; 5,756,861 and 5,808,167, the entire subject matter of which is incorporated herein by reference. Accordingly, there is a need in the chemical industry for a process that purifies nitrous oxide off-gases and at the same time commercially and economically produces nitrous oxide suitable for various commercial applications.

SUMMARY OF THE INVENTION

The present invention relates to a method for purification of a nitrous oxide gas by feeding the nitrous oxide gas and reducing agent or precursor thereof into a de-oxidation reactor, and performing de-oxidation by reacting the reducing agent or precursor thereof with oxygen using a catalyst to form an inert, in order to deplete the oxygen in the nitrous oxide gas, while limiting the amount of nitrous oxide removed from the nitrous oxide gas.

Additionally, the present invention concerns a method for purification of a nitrous oxide gas by feeding the nitrous oxide gas and ammonia or a precursor thereof into a reactor system, performing selective catalytic reduction by reacting the ammonia or precursor thereof with NOx in the nitrous oxide gas using a selective catalytic reduction catalyst, feeding hydrogen or a precursor thereof into the reactor system and performing de-oxidation by reacting the hydrogen or a precursor thereof with oxygen in the nitrous oxide gas using a de-oxidation catalyst.

BRIEF DESCRIPTION OF THE DRAWINGS

FIG. 1 is a graph of the percent oxygen destruction versus hydrogen flow in the process of Example 1.

FIG. 2 is a graph of the percent nitrous oxide destruction versus hydrogen flow of the process of Example 1.

FIG. 3 is a graph of oxygen destruction selectivity versus hydrogen flow of the process of Example 1.

FIG. 4 is a graph of the percentage of oxygen destruction versus hydrogen flow of the process of Example 2.

FIG. 5 is a graph of the percent of nitrous oxide destruction versus hydrogen flow of the process of Example 2.

FIG. 6 is a graph of oxygen destruction selectivity versus hydrogen flow of the process of Example 2.

DESCRIPTION OF ILLUSTRATIVE EMBODIMENTS

In accordance with the present invention, a nitrous oxide off-gas is purified utilizing catalytic processes to provide an economical source of nitrous oxide suitable for various commercial applications. Moreover, the process of the present invention selectively purifies nitrous oxide off-gas while maintaining the amount of nitrous oxide in the off-gas by selectively reacting out selected impurities in the off-gas. Such a purified nitrous oxide off-gas may be utilized in one-step hydroxylation of benzene to phenol, as set forth in U.S. Pat. Nos. 4,982,013; 5,001,280; 5,055,623; 5,110,995; 5,672,777; 5,756,861 and 5,808,167, the entire subject matter of which is incorporated herein by reference.

In one embodiment of the present invention, nitrous oxide off-gas is passed through an SCR reactor in the presence of ammonia or a precursor thereof to remove (e.g., by reacting) NOx while at the same time not reducing the amount of nitrous oxide in the off-gas. The reactor comprises at least one catalyst bed and may be of any suitable configuration such as fixed bed reactor, (e.g., metal, parallel plate, ceramic honeycomb, tubular, or a lateral flow reactor). Preferably, the reactor is a lateral flow reactor. A lateral flow reactor allows a pellet type of catalyst to be employed in a fixed bed providing a higher contact efficiency at a lower pressure drop than a honeycomb catalyst in the same service. Intimate mixing between the ammonia vapor and process gas is accomplished with the use of perforated plates.

The catalyst may comprise any known NOx abatement SCR catalyst, such as those based on transition metals, e.g., Ti, V, W, Mo, Mn, Cu, Fe, Cr, Co, Ni, Zn, Sn, etc. The metal may be in the form of an oxide and may be integrated with or placed on a conventional carrier, such as silica and/or alumina. Preferably, an oxide of Ti-V catalyst is used.

The catalyst pellets may be formed into any shape, such as cylinders, spheres, discs, rings, etc., or in the form of a honeycomb block and utilized under conventional SCR conditions. These conditions are dictated by the space velocity of the catalyst, its operating temperature, and the NOx loading.

For example, ammonia or a precursor thereof is mixed with the nitrous oxide off-gas containing NOx at a molar ratio with respect to the NOx from 0.1 to 2.0, preferably 0.5 to 1.5, and more preferably from 0.8 to 1.2. The mixture may be at a temperature from 100° C. to 600° C., preferably from 120° C. to 400° C., and more preferably from 150° C. to 300° C. For adipic acid off-gas service where nitrous oxide is to be preserved, a low temperature range between 150 to 350° C. is preferable. Space velocities (amount of gas in cubic meters that passes in one hour through one cubic meter of the catalyst (apparent volume of the catalyst bed) stated with the dimension reciprocal hour) in the range from 300 to 100,000 $h^{-1}$ may be utilized. The process may be conducted under any pressure. However suitable pressures range from about 1 to about 10 atmospheres.

The ammonia or precursor thereof reacts with the NOx to form $N_2$ and $H_2O$. The nitrous oxide exiting the reactor comprises less than 200 ppm of NOx, preferably less than 40 ppm, and more preferably less than 10 ppm.

Prior to entering the reactor, ammonia and a carrier gas are mixed together. The carrier gas may contain any inert gas that does not significantly deactivate the catalyst. For example, the carrier gas may contain steam, hydrogen, argon, etc., or mixtures thereof. Preferably the carrier gas contains steam.

In another embodiment of the present invention, nitrous oxide off-gas is passed through at least one reactor in the presence of a reducing agent or precursor thereof and a catalyst to remove oxygen and other impurities, such as organics (e.g., CO, etc.) without reducing the amount of nitrous oxide present in the off-gas. The reactor comprises at least one catalyst bed and may be of any suitable configuration such as a fixed bed, a tubular reactor, or a lateral flow reactor. Preferably, the reactor is a fixed bed reactor.

The catalyst may comprise any known oxidation catalyst, such as those based on a noble metal or combination of noble metals (e.g., platinum or palladium, etc.). The catalyst may be integrated with or placed on a conventional carrier, such as silica and/or alumina. Preferably, the catalyst is a palladium metal with an alumina support.

The catalyst may be formed into any shape, such as cylinders, spheres, discs, rings, etc., or in the form of a honeycomb block. Preferably, the catalyst is in the form of a honeycomb block.

In this embodiment of the present invention, stoichiometric amounts of a reducing agent or precursor thereof is mixed with the nitrous oxide off-gas containing oxygen. The mixture may be at a temperature from 0° C. to 600° C., preferably from 5° C. to 300° C., and more preferably from 10° C. to 200° C. Space velocities (amount of gas in cubic meters that passes in one hour through one cubic meter of the catalyst (apparent volume of the catalyst bed) stated with the dimension reciprocal hour) in the range from 300 to 100,000 $h^{-1}$ may be utilized. The process may be conducted under any pressure. However suitable pressures range from about 1 to about 10 atmospheres.

The reducing agent or precursor thereof may be mixed with the nitrous oxide off-gas prior to entering the reactor, or in the reactor itself. This may be accomplished using conventional means, such as an inline mixer. Suitable reducing agents include agents that selectively react with oxygen in the nitrous oxide off-gas without depleting the nitrous oxide in the off-gas. For example, the reducing agent may be hydrogen, which selectively reacts (using an appropriate catalyst as described herein) with oxygen present in the off-gas to produce water. In an embodiment of the present invention, it has been discovered that the hydrogen unexpectedly does not deplete the nitrous oxide in the off-gas (hydrogen would have been expected to also react with nitrous oxide to form nitrogen and water. Another suitable reducing agent is, for example, carbon monoxide, which selectively reacts with oxygen to form carbon dioxide without depleting the nitrous oxide present in the off-gas. The reducing gas may contain a mixture of gases, such as hydrogen and carbon monoxide. Preferably, the reducing gas is a hydrogen containing gas. The hydrogen may be provided in any form, including any hydrogen containing gas such as hydrogen plant offgas, offgas from a dehydrogenation process (e.g. ethylbenzene to styrene), etc. Preferably, the hydrogen is provided in the form of pure hydrogen.

In another embodiment of the present invention, the nitrous oxide off-gas is passed through an SCR reactor to remove NOx utilizing the NOx abatement process of the present invention and subsequently the nitrous oxide off-gas is passed through a de-oxidation reactor to remove oxygen and other impurities using the de-oxidation process of the present invention. Alternatively, the de-oxidation process may precede the NOx abatement process. Moreover, such processes may be conducted multiple times and in any order. The NOx abatement and de-oxidation processes may be conducted in a single reactor having multiple catalyst beds or in a single reactor having multiple chambers. Additionally, each of the NOx abatement and de-oxidation processes may be conducted utilizing multiple reactors. Preferably, NOx abatement precedes de-oxidation.

The recovery of nitrous oxide from the nitrous oxide off-gas utilizing the present purification system comprises greater than 50%, preferably greater than 70%, and more preferably greater than 95%.

EXAMPLES

Processes of the present invention are further defined by reference to the following illustrative examples.

Example I

A process for purification of a nitrous oxide gas of the present invention is performed as follows:

A 0.2% w/w Pd on alumina catalyst in the form of beads from Johnson-Matthey is exposed to a gas stream of 60 cc/min composed of 2.4 cc/min of oxygen, 36 cc/min of nitrous oxide, and 6 cc/min of helium at 150° C. in a quartz reactor. Contact time is 4.6 seconds. Part of the helium gas is gradually replaced by pure hydrogen. Reaction is followed up by analysis of the reactor effluent by mass spectrometry (amu 32 for oxygen, amu 28, 30 and 44 for nitrous oxide, amu 2 for hydrogen, amu 18 for water). Complete reaction of hydrogen is observed in all the tested cases. FIGS. 1 and 2 illustrate the selective reaction of oxygen with hydrogen, and not with nitrous oxide, respectively. FIG. 1 shows the oxygen destruction as a function of the hydrogen flow. FIG. 2 demonstrates the percent nitrous oxide destruction as a function of the hydrogen flow. FIG. 3 represents the oxygen destruction selectivity as a function of the hydrogen flow.

Example II

The same experiment is conducted at 25° C. with a contact time of 0.7 sec with the same gas stream composition and velocities. FIGS. 4 and 5 demonstrate the performance achieved in this set of conditions. FIG. 4 shows the oxygen destruction as a function of the hydrogen flow. FIG. 5 illustrates the percent nitrous oxide destruction as a function of the hydrogen flow. FIG. 6 demonstrates the oxygen destruction selectivity as a function of the hydrogen flow.

Example III

The same experiment is conducted at 25° C. with a contact time of 0.7 sec with the same gas stream composition and velocity but hydrogen is partially replaced by CO (i.e., up to 50 vol. % CO). Results in terms of oxygen destruction and selectivities are the same as those provided by pure hydrogen.

Example IV

A process for purification of a nitrous oxide gas of the present invention is performed as follows:

A commercial SCR catalyst, Grade S-096 supplied by CRI Catalyst Company, Inc., is exposed to an adipic off-gas stream of 15 slpm containing 0.3% NOx, 8.0% $O_2$, 26.5% $N_2O$, 0.1% CO, 0.2% organic impurities (on a Carbon basis), and the balance inerts at an inlet temperature of 247° C. in an isothermal pipe reactor heated by a sandbath; Space velocity is 15,000 reciprocal hours. The ammonia is fed stoichiometrically to the NOx levels which are measured with an online NOx analyzer. The outlet composition is as follows: 0.044% NOx, 7.3% $O_2$, 26.5% $N_2O$, 0.2% CO, 0.008% organic impurities (on a Carbon basis), and the balance inerts.

What is claimed is:

1. A method for purification of a nitrous oxide gas containing $O_2$, said method comprising:
   feeding said nitrous oxide gas and a reducing agent selected from the group consisting of hydrogen, carbon monoxide, ammonia and mixtures thereof into a de-oxidation reactor;
   performing de-oxidation by reacting said reducing agent with $O_2$ using a de-oxidation catalyst selected from the group consisting of palladium, platinum and mixtures thereof to form an inert, in order to deplete said $O_2$ in said nitrous oxide gas, while limiting the amount of nitrous oxide removed from said nitrous oxide gas.

2. A method according to claim 1, wherein said reducing agent is hydrogen.

3. A method according to claim 1, wherein said inert comprises water or carbon dioxide.

4. A method according to claim 1, wherein said inert is water.

5. A method according to claim 1, wherein said nitrous oxide gas further comprises NOx, nitrogen, carbon monoxide, carbon dioxide or organic compounds.

6. A method according to claim 5, wherein said NOx is removed from said nitrous oxide gas by selective catalytic reduction using ammonia or a precursor thereof and a selective catalytic reduction catalyst.

7. A method according to claim 6, wherein said selective catalytic reduction catalyst is selected from the group consisting of oxides of vanadium, titanium and mixtures thereof.

8. A method according to claim 6, wherein said selective catalytic reduction is performed in a selective catalytic reduction reactor separate from said de-oxidation reactor.

9. A method according to claim 8, wherein said selective catalytic reduction reactor is a lateral flow reactor.

10. A method according to claim 6, wherein steam is used as a carrier gas for said nitrous oxide gas during said selective catalytic reduction.

11. A method according to claim 6, wherein prior to said selective catalytic reduction, an oxygen containing gas is passed over said selective catalytic reduction catalyst.

12. A method according to claim 5, wherein said carbon monoxide and organic compounds are removed from said nitrous oxide gas during said de-oxidation.

13. A method according to claim 1, wherein said nitrous oxide gas comprises adipic acid off-gas.

14. A method according to claim 13, wherein said off-gas comprises between 1000 ppmv and 10 vol. % $O_2$, and between 100 ppmv and 1% NOx.

15. A method according to claim 1, wherein up to 99 vol. % of said $O_2$ is removed from said nitrous oxide gas.

16. A method according to claim 1, wherein said de-oxidation step is performed with more than one reactor.

* * * * *